(12) United States Patent
McCormick

(10) Patent No.: US 8,814,179 B1
(45) Date of Patent: Aug. 26, 2014

(54) SHOPPING CART WHEEL SKI ATTACHMENT DEVICE

(71) Applicant: Dennis E. McCormick, Chugiak, AK (US)

(72) Inventor: Dennis E. McCormick, Chugiak, AK (US)

(*) Notice: Subject to any disclaimer, the term of this patent is extended or adjusted under 35 U.S.C. 154(b) by 0 days.

(21) Appl. No.: 14/032,916

(22) Filed: Sep. 20, 2013

(51) Int. Cl.
*B62B 13/00* (2006.01)

(52) U.S. Cl.
USPC ............... 280/13; 280/8; 280/10; 280/43.11; 280/47.34

(58) Field of Classification Search
USPC ............. 280/33.991, 13, 28.5, 8; 16/39 R, 41
See application file for complete search history.

(56) References Cited

U.S. PATENT DOCUMENTS

| | | | |
|---|---|---|---|
| 2,589,602 A | 3/1952 | Clark | |
| 3,214,786 A * | 11/1965 | Butsch | 16/41 |
| 4,251,085 A * | 2/1981 | Lageer et al. | 280/10 |
| 4,498,688 A | 2/1985 | Walters et al. | |
| D283,264 S | 4/1986 | Levy-Joseph | |
| 4,589,668 A | 5/1986 | Mares | |
| 5,413,361 A | 5/1995 | Mosher | |
| 5,427,390 A | 6/1995 | Duncan et al. | |
| 5,441,285 A | 8/1995 | Russell, Jr. et al. | |
| 5,911,422 A * | 6/1999 | Carpenter et al. | 280/8 |
| 7,121,560 B1 | 10/2006 | Balzano | |
| 7,163,209 B2 | 1/2007 | Moscaret et al. | |
| 7,364,170 B2 | 4/2008 | Alttama et al. | |
| 2004/0061294 A1 | 4/2004 | Flanigan, Jr. | |

* cited by examiner

*Primary Examiner* — John Walters
*Assistant Examiner* — James Triggs

(57) ABSTRACT

A shopping cart wheel ski device facilitates movement of a shopping cart over a surface. The device includes a plate having a bottom surface. An aperture extends through the plate. Each of a pair of spaced arms is coupled to and extends upwardly from the plate. Each arm is configured for engaging a shopping cart wheel such that an outer perimeter surface of the shopping cart wheel extends through the aperture.

19 Claims, 3 Drawing Sheets

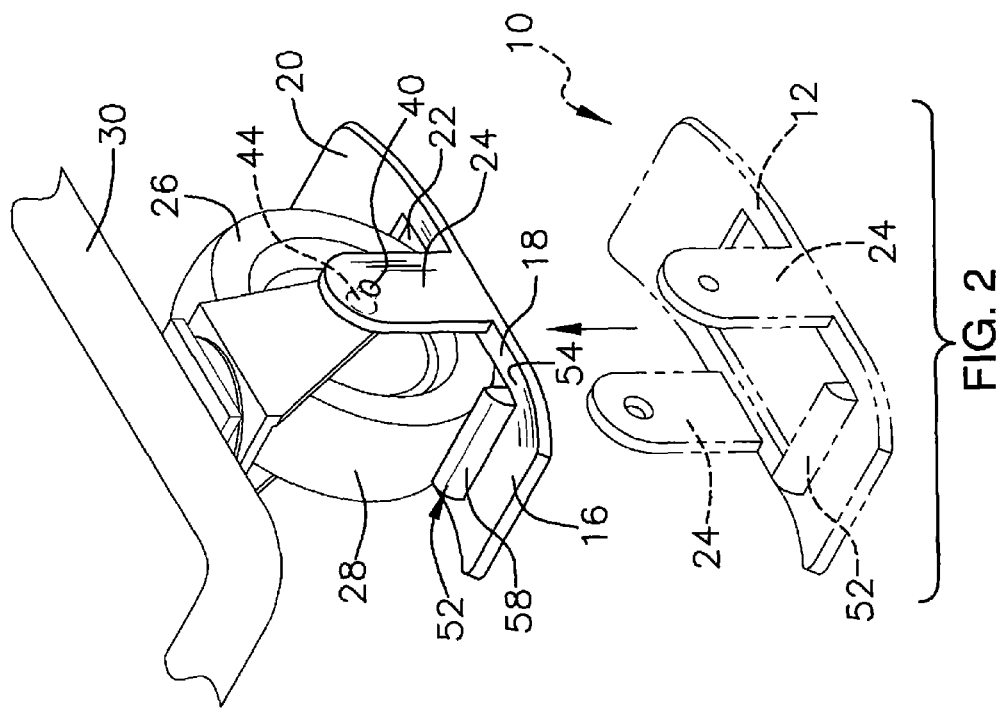
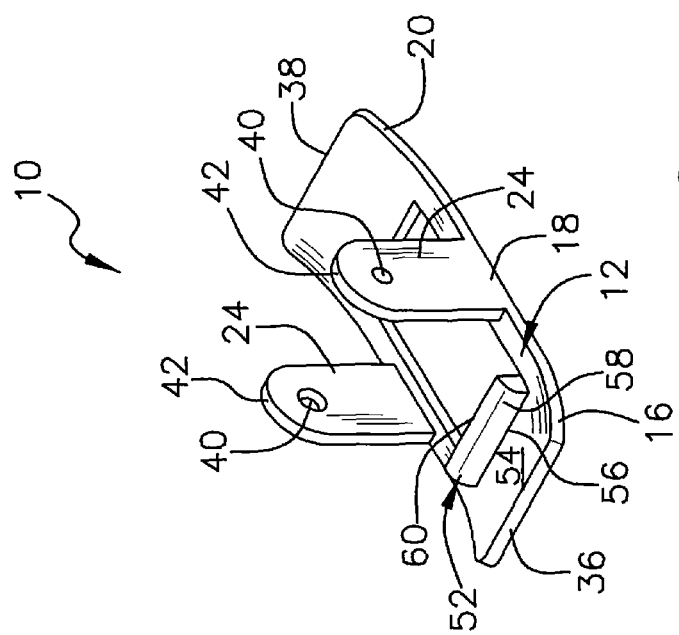
FIG. 1
FIG. 2

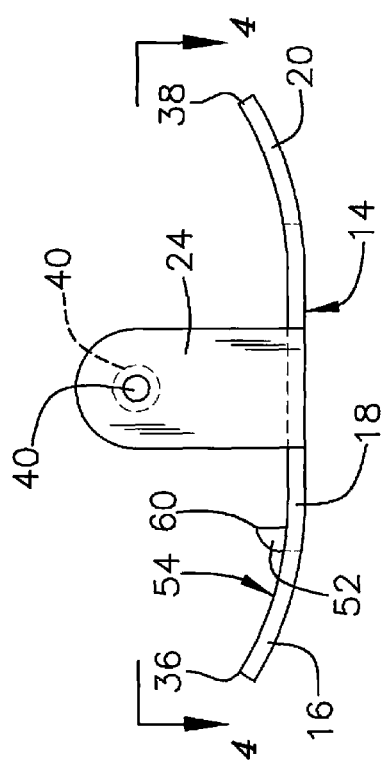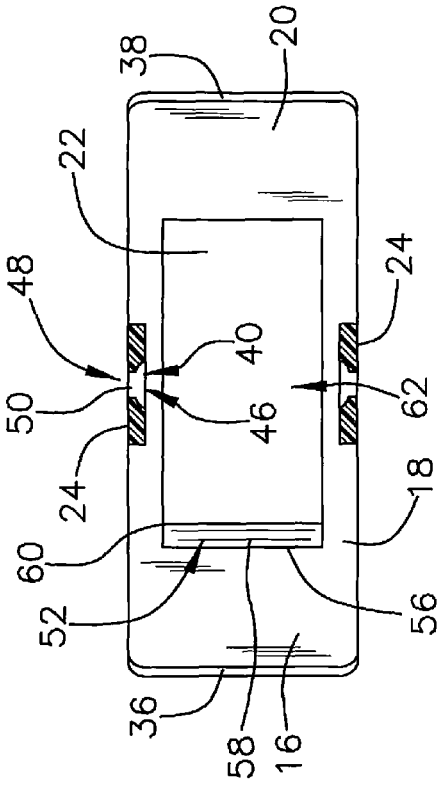

SHOPPING CART WHEEL SKI ATTACHMENT DEVICE

BACKGROUND OF THE DISCLOSURE

Field of the Disclosure

The disclosure relates to cart wheel attachment devices and more particularly pertains to a new cart wheel attachment device for facilitating movement of a shopping cart over a surface.

SUMMARY OF THE DISCLOSURE

An embodiment of the disclosure meets the needs presented above by generally comprising a plate having a bottom surface. An aperture extends through the plate. Each of a pair of spaced arms is coupled to and extends upwardly from the plate. Each arm is configured for engaging a shopping cart wheel such that an outer perimeter surface of the shopping cart wheel extends through the aperture.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top front side perspective view of a shopping cart wheel ski device according to an embodiment of the disclosure.

FIG. 2 is a top front side perspective view of an embodiment of the disclosure in use.

FIG. 3 is a side view of an embodiment of the disclosure.

FIG. 4 is a cross-sectional view of an embodiment of the disclosure taken along line 4-4 of FIG. 3.

DESCRIPTION OF THE PREFERRED EMBODIMENT

Figure 5:
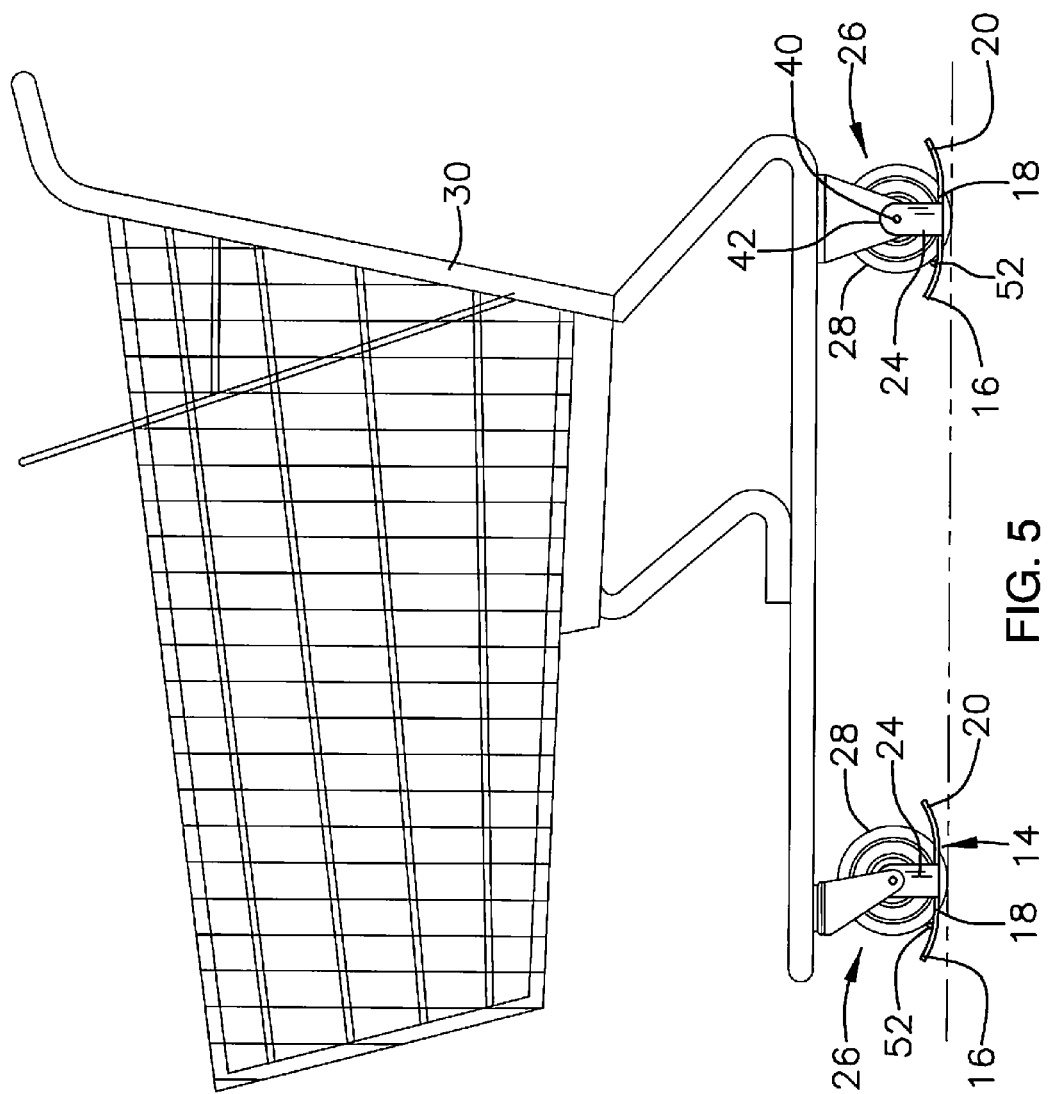
FIG. 5 is a side view of an embodiment of the disclosure in use.

With reference now to the drawings, and in particular to FIGS. 1 through 5 thereof, a new cart wheel attachment device embodying the principles and concepts of an embodiment of the disclosure and generally designated by the reference numeral 10 will be described.

As best illustrated in FIGS. 1 through 5, the shopping cart wheel ski device 10 generally comprises a plate 12 having a bottom surface 14. The plate 12 may have an upwardly turned front section 16. The upwardly turned front section 16 may be substantially arcuate extending forwardly from a central section 18 of the plate 12. The plate 12 may further have an upwardly turned rear section 20. The upwardly turned rear section 20 extends rearwardly from the central section 18 of the plate 12. An aperture 22 extends through the plate 12. The aperture 22 may be centered with respect to the plate 12 and extend beyond the central section 18 of the plate 12 into the front section 16 and the rear section 20. The aperture 22 may be substantially elongated and rectangular in shape. A pair of spaced arms 24 is coupled to and extends upwardly from the plate 12. Each arm 24 is configured for engaging a shopping cart wheel 26 such that an outer perimeter surface 28 of the shopping cart wheel 26 extends through the aperture 22 sufficiently to allow a shopping cart 30 to move on the shopping cart wheel 26. Each arm 24 may be centered between a forward edge 36 of the plate 12 and a rearward edge 38 of the plate 12.

Each of a pair of holes 40 extends through an associated one of the arms 24. Each hole 40 is positioned proximate an upper end 42 of the associated arm 24 wherein each hole 40 is positioned to receive a connector 44 or a portion of the shopping cart wheel 26 securing each arm 24 to the shopping cart wheel 26. Each hole 40 may have an interior side 46 and an exterior side 48. Each hole 40 may be tapered extending into the associated arm 24 from the interior side 46 towards the exterior side 48. Each hole 40 may further have an outer section 50 extending inwardly from the exterior side 48 towards the interior side 46. The outer section 50 may have a constant transverse radius wherein the outer section 50 is cylindrical. The holes 40 may be laterally aligned to engage an axle of the shopping cart wheel 26 or protrusions substantially aligned with the axle of the shopping cart wheel 26.

A scraper 52 may be coupled to and extend upwardly from a top surface 54 of the plate 12 adjacent to and extending across a forward edge 56 of the aperture 22. The scraper 52 has a curved forward face 58 wherein a distal edge 60 of the scraper 52 relative to the plate 12 is directed towards a center 62 of the aperture 22 such that the scraper 52 is configured for preventing debris from building up on the outer perimeter surface 28 of the shopping cart wheel 26 extending through the aperture 22.

In use, the device 10 is applied to each shopping cart wheel 26 of the shopping cart 30. The bottom surface 14 of the plate 12 is positioned to act as a ski or skid to assist in moving the shopping cart 30 across a surface 56 which may be fouled by snow, sand, or the like. The plate 12 assists in supporting each shopping cart wheel 26 in a position over the surface preventing the wheels 26 from becoming substantially buried and hindering movement of the shopping cart 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A shopping cart wheel ski attachment device comprising:

a plate having a bottom surface;

an aperture extending through said plate;

a pair of spaced arms coupled to and extending upwardly from said plate, each said arm being configured for engaging a shopping cart wheel such that an outer perimeter surface of the shopping cart wheel extends through said aperture; and a pair of holes, each hole extending through an associated one of said arms, each said hole being positioned proximate an upper end of said associated arm wherein each said hole is positioned to for coupling to the shopping cart wheel, each said hole having an interior side and an exterior side, each said hole being tapered extending into said associated arm from said interior side towards said exterior side.

2. The device of claim 1, further comprising said plate having an upwardly turned front section.

3. The device of claim 2, further comprising said upwardly turned front section being arcuate extending forwardly from a central section of said plate.

4. The device of claim 1, further comprising said plate having an upwardly turned rear section.

5. The device of claim 4, further comprising said upwardly turned rear section extending rearwardly from said central section of said plate.

6. The device of claim 1, further comprising each said hole having an outer section extending inwardly from said exterior side towards said interior side, said outer section having a constant transverse radius wherein said outer section is cylindrical.

7. The device of claim 1, further comprising said holes being laterally aligned.

8. The device of claim 1, further comprising each said arm being centered between a forward edge of said plate and a rearward edge of said plate.

9. The device of claim 1, further comprising a scraper coupled to and extending upwardly from a top surface of said plate adjacent to and extending across a forward edge of said aperture.

10. The device of claim 9, further comprising said scraper having a curved forward face wherein a distal edge of said scraper relative to said plate is directed towards a center of said aperture such that said scraper is configured for preventing debris from building up on the outer perimeter surface of the shopping cart wheel extending through said aperture.

11. A shopping cart wheel ski attachment device comprising:

a plate having a bottom surface, said plate having an upwardly turned front section, said upwardly turned front section being arcuate extending forwardly from a central section of said plate, said plate having an upwardly turned rear section, said upwardly turned rear section extending rearwardly from said central section of said plate;

an aperture extending through said plate;

a pair of spaced arms coupled to and extending upwardly from said plate, each said arm being configured for engaging a shopping cart wheel such that an outer perimeter surface of the shopping cart wheel extends through said aperture, each said arm being centered between a forward edge of said plate and a rearward edge of said plate;

a pair of holes, each hole extending through an associated one of said arms, each said hole being positioned proximate an upper end of said associated arm wherein each said hole is positioned for coupling to the shopping cart wheel, each said hole having an interior side and an exterior side, each said hole being tapered extending into said associated arm from said interior side towards said exterior side, each said hole having an outer section extending inwardly from said exterior side towards said interior side, said outer section having a constant transverse radius wherein said outer section is cylindrical, said holes being laterally aligned; and a scraper coupled to and extending upwardly from a top surface of said plate adjacent to and extending across a forward edge of said aperture, said scraper having a curved forward face wherein a distal edge of said scraper relative to said plate is directed towards a center of said aperture such that said scraper is configured for preventing debris from building up on the outer perimeter surface of the shopping cart wheel extending through said aperture.

12. A shopping cart wheel ski system comprising:

a shopping cart including a frame having a plurality of wheel assemblies attached thereto, each of said wheel assemblies including:

a wheel mount comprising a pair of spaced walls extending downwardly from said frame;

a cart wheel positioned between said spaced walls;

an axle extending through said cart wheel and said spaced walls, said axle having a pair of terminal ends, each of said terminal ends being positioned adjacent to one of said spaced walls;

a plurality of shopping cart skis, each of said wheel assemblies having one of said shopping cart skis mounted thereto, each of said shopping cart skis including:

a plate having a bottom surface;

an aperture extending through said plate;

a pair of spaced arms coupled to and extending upwardly from said plate, said wheel mount being positioned between said spaced arms, each of said spaced arms engaging said wheel assembly such that an outer perimeter surface of the shopping cart wheel extends through said aperture.

13. The system of claim 12, further comprising said plate having an upwardly turned front section.

14. The system of claim 13, further comprising said plate having an upwardly turned rear section.

15. The system of claim 12, further comprising a pair of laterally aligned holes, each hole extending through an associated one of said arms, each said hole being positioned proximate an upper end of said associated arm wherein each said hole is positioned to for receiving said terminal ends of said axle.

16. The system of claim 15, further comprising each said hole having an interior side and an exterior side, each said hole being tapered extending into said associated arm from said interior side towards said exterior side.

17. The system of claim 6, further comprising each said hole having an outer section extending inwardly from said exterior side towards said interior side, said outer section having a constant transverse radius wherein said outer section is cylindrical.

18. The system of claim 12, further comprising a scraper coupled to and extending upwardly from a top surface of said plate adjacent to and extending across a forward edge of said aperture.

19. The device of claim 18, further comprising said scraper having a curved forward face wherein a distal edge of said scraper relative to said plate is directed towards a center of said aperture such that said scraper is configured for preventing debris from building up on the outer perimeter surface of the shopping cart wheel extending through said aperture.

* * * * *